United States Patent
Chen

(10) Patent No.: US 6,837,700 B2
(45) Date of Patent: Jan. 4, 2005

(54) MOLD ARTICLE EJECTING DEVICE USED FOR AN INJECTION MOLDING APPARATUS

(76) Inventor: Tung-Jung Chen, No. 61, Cheng-Ho St., Lu-Chou City, Taipei Hsien (TW)

(*) Notice: Subject to any disclaimer, the term of this patent is extended or adjusted under 35 U.S.C. 154(b) by 266 days.

(21) Appl. No.: 10/269,396

(22) Filed: Oct. 11, 2002

(65) Prior Publication Data

US 2004/0071815 A1 Apr. 15, 2004

(51) Int. Cl.[7] .............................................. B29C 45/40
(52) U.S. Cl. ...................................... 425/556; 264/334
(58) Field of Search ................................ 425/556, 444, 425/436 R, DIG. 58

(56) References Cited

U.S. PATENT DOCUMENTS

| | | | | |
|---|---|---|---|---|
| 3,387,334 A | * | 6/1968 | Belanger et al. ............ | 425/556 |
| 5,074,779 A | * | 12/1991 | Tsutsumi et al. ........... | 425/444 |
| 5,512,223 A | * | 4/1996 | Morikita ...................... | 425/556 |
| 6,179,599 B1 | * | 1/2001 | Venrooij et al. ............ | 425/444 |
| 6,457,968 B1 | * | 10/2002 | Navarra Pruna ............ | 425/556 |
| 6,641,382 B2 | * | 11/2003 | Mine .......................... | 425/556 |

* cited by examiner

Primary Examiner—Tim Heitbrink
(74) Attorney, Agent, or Firm—Ladas & Parry LLP

(57) ABSTRACT

A molded article ejecting device includes proximate and distal ejector plates which are movable relative to a stationary plate of an injection molding apparatus, an ejector pin which is positioned by and which is moved with the ejector plates to knock out a molded article from the stationary plate, and an ejector rod which is actuated by way of an actuator to perform a to-and-fro movement and which has a head portion that is detachably coupled to the distal ejector plate by a coupler mechanism in a frictional engagement that is maintained when the ejector rod is set in the to-and-fro movement.

8 Claims, 6 Drawing Sheets

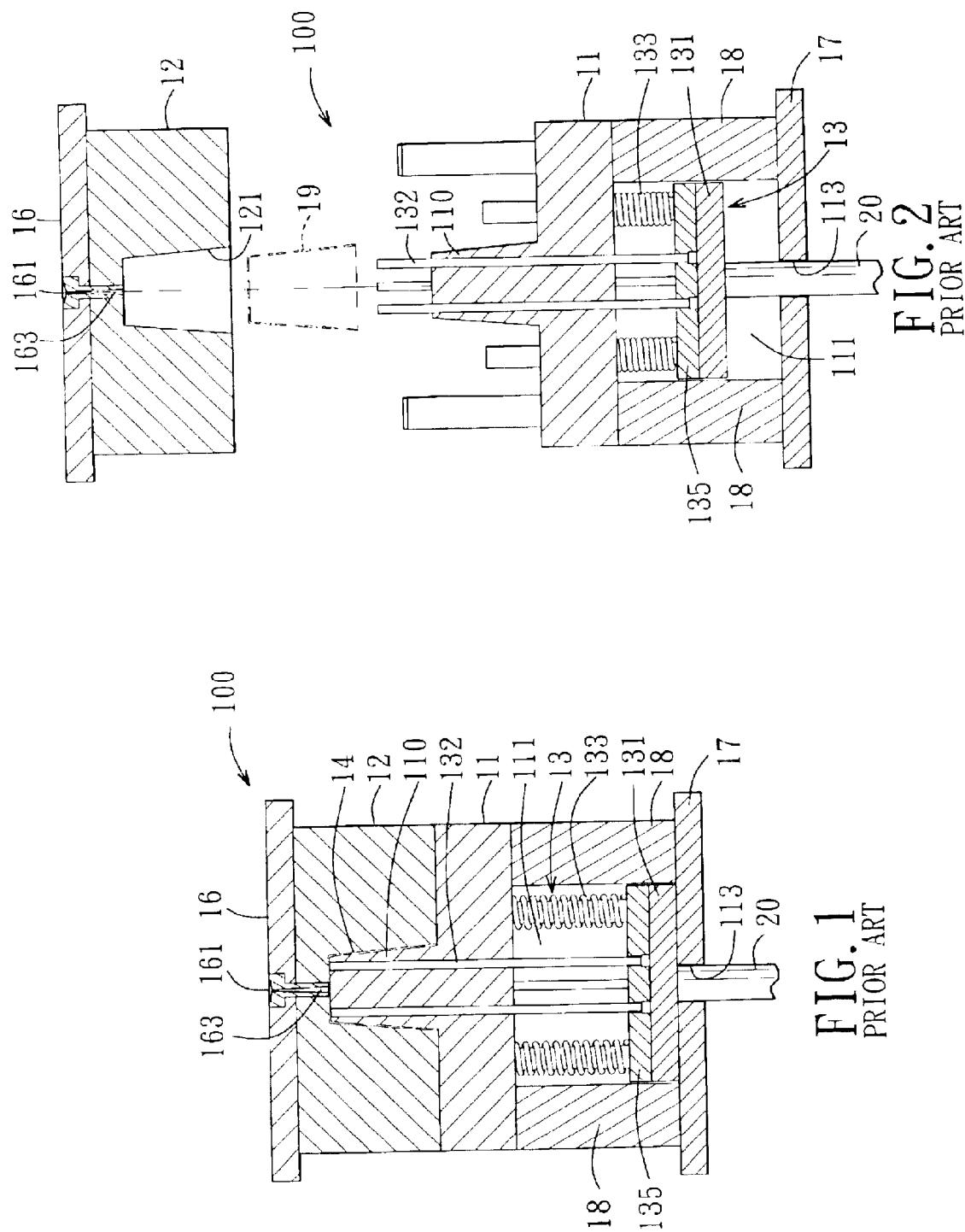

MOLD ARTICLE EJECTING DEVICE USED FOR AN INJECTION MOLDING APPARATUS

BACKGROUND OF THE INVENTION

1. Field of the Invention

This invention relates to a mold article ejecting device used for an injection molding apparatus, more particularly to a mold article ejecting device with an injector rod which can be moved in a to-and-fro movement and which is detachably coupled to an ejector plate for removing a molded article from a mold cavity of an injection molding apparatus.

2. Description of the Related Art

Referring to FIGS. 1 and 2, a conventional injection molding machine 100 is shown to include a movable plate 12 which is mounted on an upper support plate 16, a stationary plate 11 and a molded article ejecting device 13 which are mounted on a lower support plate 17. The movable and stationary plates 12,11 have cup-shaped mold portions 121,110, and abut against each other to form a cup-shaped mold cavity 14 in an injection position, as shown in FIG. 1. A hopper 161 and a sprue channel 163 are formed through the upper support plate 16 to communicate with the mold portion 121 such that liquid molding material flows from the hopper 161 through the sprue channel 163 into the mold cavity 14.

Partition plates 18 are mounted between the stationary plate 11 and the lower support plate 17 so as to confine a space 111 for accommodating the ejecting device 13. The ejection device 13 includes a distal ejector plate 131, a proximate ejector plate 135, ejector pins 132, and springs 133. The ejector pins 132 have inner segments which are secured between the proximate and distal ejector plates 135,131, and outer segments which extend slidably through the mold portion 110 of the stationary plate 11. The springs 133 are mounted between the proximate ejector plate 135 and the stationary plate 11. An ejector rod 20 is inserted into a through bore 113 in the lower support plate 17, and is actuated to press the distal ejector plate 131 so as to move the distal ejector plate 135 and the ejector pins 132 against the biasing action of the springs 133, thereby knocking out a molded article 19 from the stationary plate 11. The distal ejector plate 131 is retracted by virtue of the biasing force of the springs 133 when the ejector rod 20 is moved back so as to retract the ejector pins 132.

Since the ejector pins 132 are retracted by means of the springs 133, the space 111 has to be large enough to receive the springs 133, thereby resulting in bulkiness of the machine 100. Moreover, long term use will result in fatigue of the springs 133, so that the ejector pins 132 cannot be retracted completely.

Referring to FIGS. 3 and 4, another conventional injection molding machine 200 is shown to include a stationary plate 21, a movable plate 22, a transverse plate 24 which is movable transversely on the stationary plate 21 and which is actuated by a control rod 25 that is mounted on the movable plate 22. Since the transverse plate 24 is designed to be moved to a position where an ejector pin 27 projects outwardly of the stationary plate 21 before the movable plate 22 abuts against the stationary plate 21, fatigue of springs 28 is likely to result in collision between the transverse plate 24 and the ejector pin 27.

SUMMARY OF THE INVENTION

The object of the present invention is to provide a molded article ejecting device which can maintain steady movement of a proximate ejector plate between knock-out and retracting positions so as to prevent molding parts of an injection molding apparatus from collision with ejector pins.

Another object of the present invention is to provide a molded article ejecting device which has an ejector rod capable of being detached from a distal ejector plate.

A further object of the present invention is to provide a molded article ejecting device which has a compact size.

According to this invention, the molded article ejecting device includes a proximate ejector plate which is adapted to be disposed distal from a movable plate, and which is movable along an axis between knock-out and retracted positions, where the proximate ejector plate is closer to and distal from a stationary plate, respectively. The proximate ejector plate has a receiving bore which extends therethrough in an axial direction parallel to the axis. An ejector pin includes an inner segment which is received and fitted in the receiving bore and which terminates at a butt end, and an outer segment which is distal from the butt end and which extends from the inner segment in the axial direction. The outer segment is disposed outwardly of the receiving bore, and is adapted to slidably pass through the stationary plate so as to be moved into or away from a mold cavity between the stationary and movable plates when the proximate ejector plate is moved to the knock-out position or the retracted position. A distal ejector plate is disposed distal from the stationary plate, and includes proximate and distal major ejector surfaces opposite to each other in the axial direction. The proximate major ejector surface confronts the proximate ejector plate, and is disposed to abut against the butt end, thereby securing the inner segment in the receiving bore. An ejector rod includes an actuated end which is disposed distal from the distal ejector plate and which is adapted to be actuated by means of an actuator so as to enable the ejector rod to perform a to-and-fro movement, and a head portion which is disposed opposite to the actuated end in the axial direction. A coupler mechanism is disposed to detachably couple the head portion to the distal ejector plate in a frictional engagement such that the engagement is maintained when the ejector rod is set in the to-and-fro movement.

BRIEF DESCRIPTION OF THE DRAWINGS

Other features and advantages of the present invention will become apparent in the following detailed description of the preferred embodiment of the invention, with reference to the accompanying drawings, in which:

FIG. 1 is a sectional schematic view of a conventional injection molding machine in a closed state;

FIG. 2 is a sectional schematic view of the conventional injection molding machine in an opened state;

DETAILED DESCRIPTION OF THE PREFERRED EMBODIMENT

Figure 3:
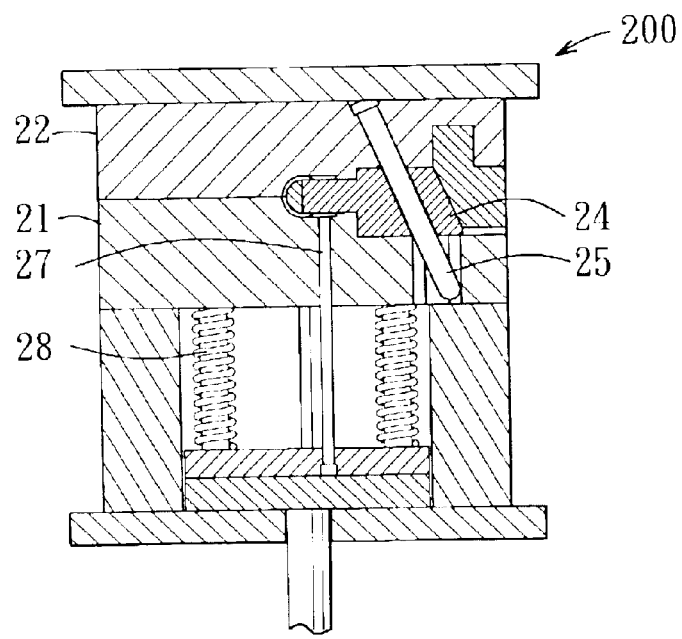
FIG. 3 is a sectional schematic view of another conventional injection molding machine in a closed state.
Figure 4:
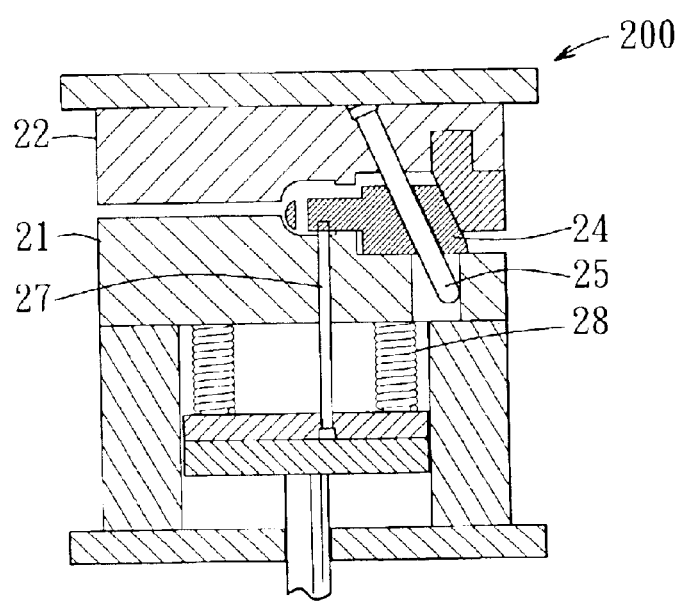
FIG. 4 is a sectional schematic view of the conventional injection molding machine in an open state.
Figure 5:
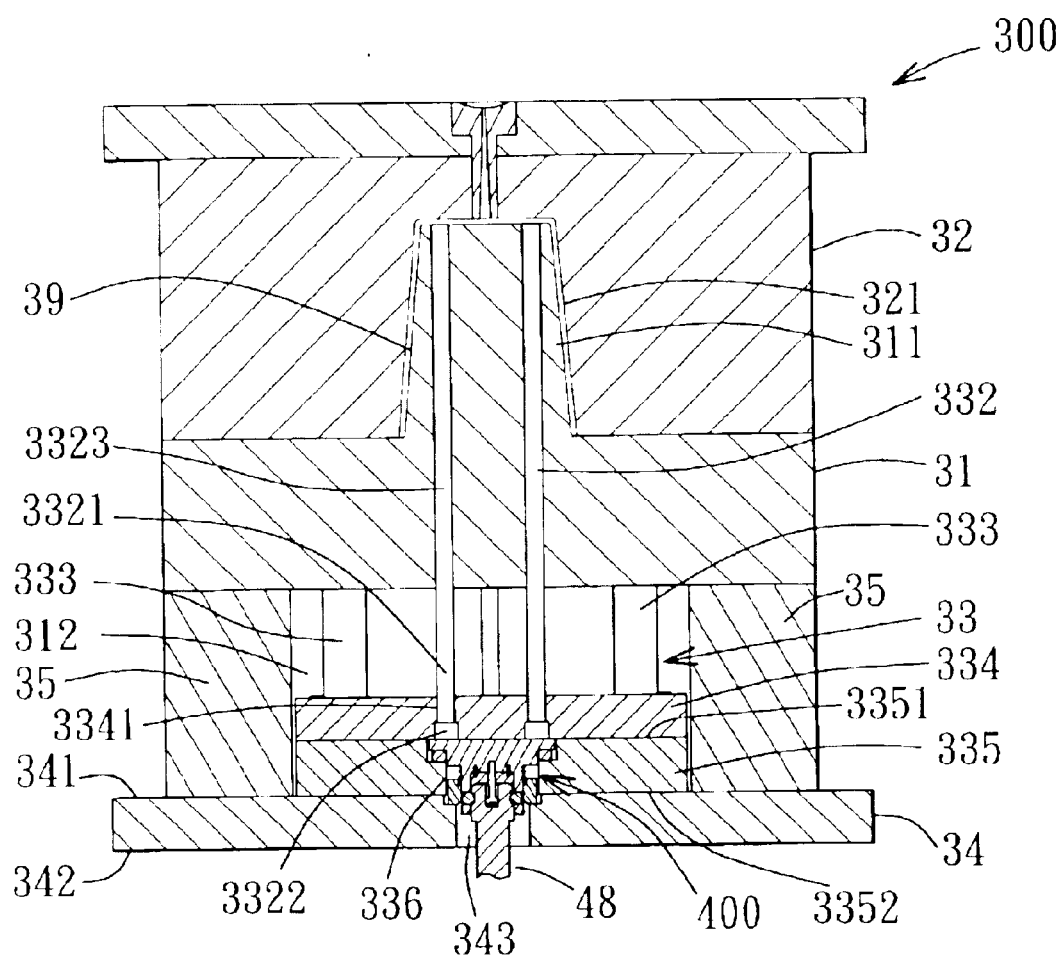
FIG. 5 is a sectional schematic view of a preferred embodiment of a molded article ejecting device according to this invention when used for an injection molding apparatus.
Figure 6:
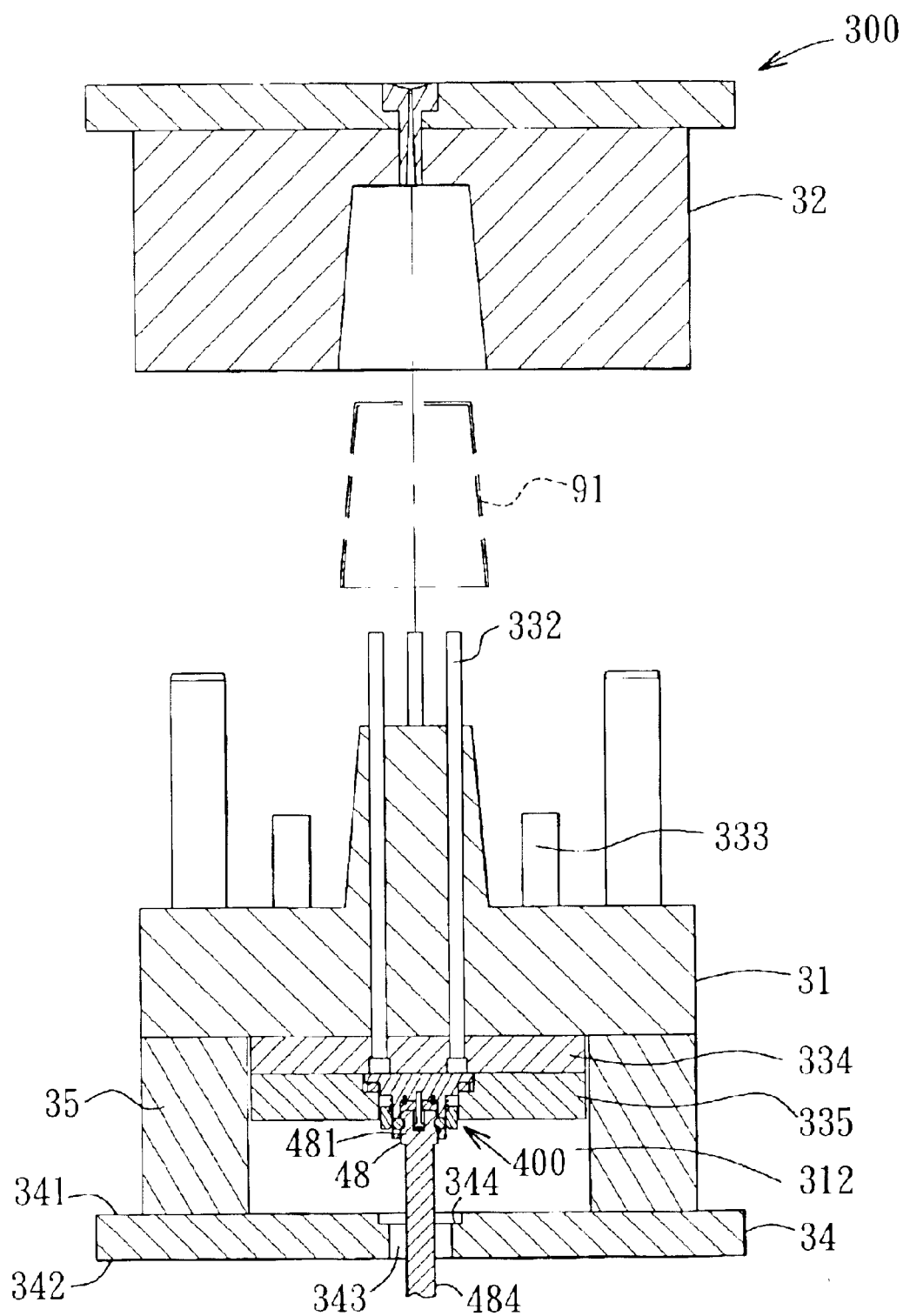
FIG. 6 is a sectional schematic view similar to FIG. 5 but viewed in an opened state.
Figure 7:
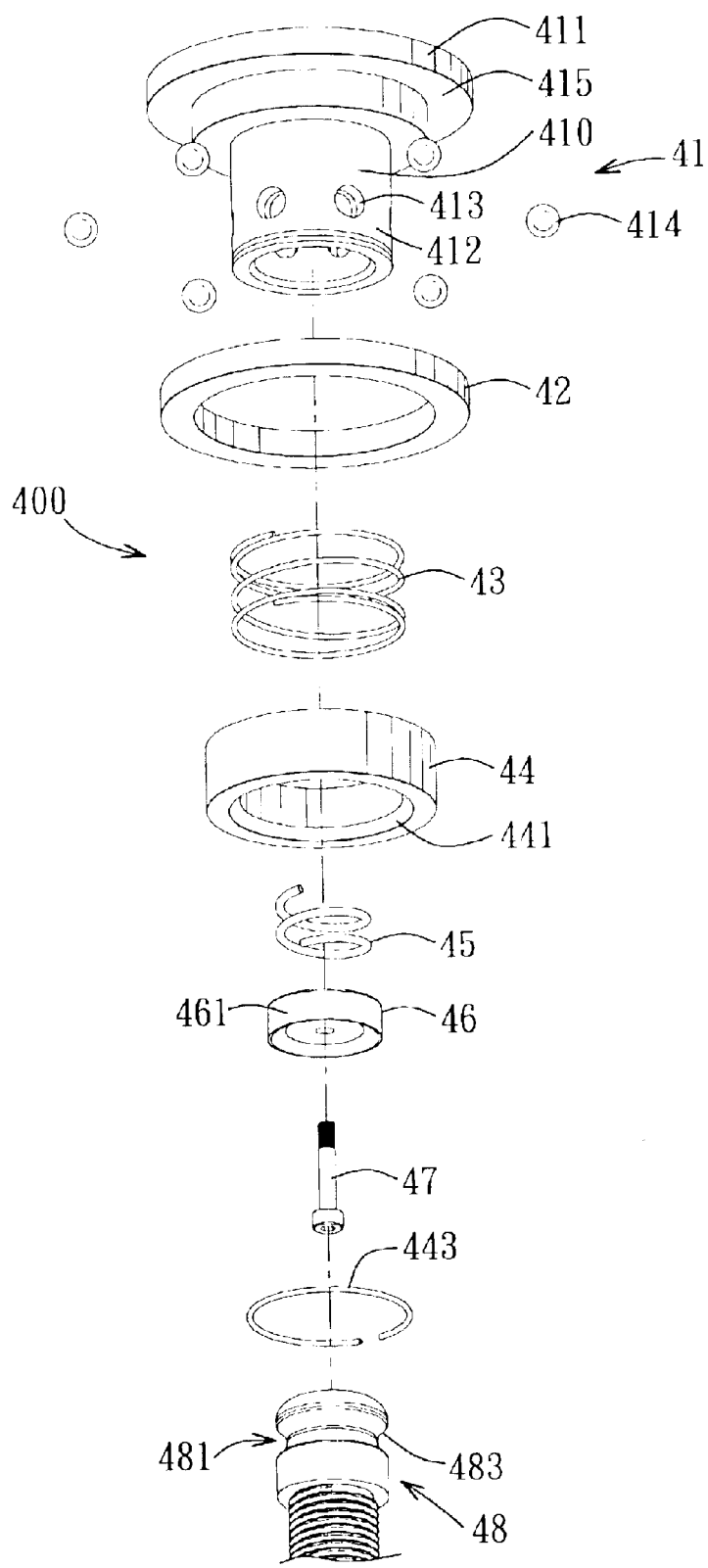
FIG. 7 is a fragmentary exploded perspective view of a coupler mechanism and an ejector rod of the preferred embodiment.

Referring to FIGS. 5 to 7, the preferred embodiment of the molded article ejecting device 33 according to the present invention is shown to be used for an injection molding apparatus 300, and is adapted to be operated by means of an actuator (not shown), such as a hydraulic cylinder, to perform a to-and-fro movement along an axis (except a mounting support 34). The injection molding apparatus 300 includes a stationary plate 31 with a first mold portion 311, and a movable plate 32 with a second mold portion 321 which mates with the first mold portion 311. The movable plate 32 is disposed to be movable along the axis between an injecting position, where the movable plate 32 abuts against the stationary plate 31, as shown in FIG. 5, such that the first and second mold portions 311,321 confine a mold cavity 39 for molding of a molded article 91, such as a plastic cup, therein, and a removal position, as shown in FIG. 6, where the movable plate 32 is remote from the stationary plate 31 so as to permit the molded article 91 to be knocked out from the mold cavity 39.

The molded article ejecting device 33 is shown to comprise a mounting support 34, a proximate ejector plate 334, a plurality of ejector pins 332, a distal ejector plate 335, an ejector rod 48, and a coupler mechanism 400.

The mounting support 34 has proximate and distal major mounting surfaces 341,342 opposite to each other in an axial direction that is parallel to the axis. The distal major mounting surface 342 has an opening 343 which extends through the proximate major mounting surface 341. The mounting support 34 is spaced apart from the stationary plate 31 by means of partition plates 35 so as to confine a space 312 thereamong. In addition, the mounting support 34 has a surrounding seat 344 which is disposed inwardly of the proximate major mounting surface 341 and which communicates with the opening 343 in a radial direction relative to the axis.

The proximate ejector plate 334 is disposed in the space 312, and is movable a long the axis between a knock-out position, as shown in FIG. 6, where the proximate ejector plate 334 is closer to the stationary plate 31, and a retracted position, as shown in FIG. 5, where the proximate ejector plate 334 is distant from the stationary plate 31. The proximate ejector plate 334 has a plurality of receiving bores 3341 which extend therethrough in the axial direction.

Each of the ejector pins 332 includes an inner segment 3321 which is received and fitted in the respective receiving bore 3341 and which terminates at a butt end 3322, and an outer segment 3323 which is distal from the butt end 3322 and which extends from the inner segment 3321 in the axial direction. The outer segment 3323 is disposed outwardly of the receiving bore 3341, and slidably passes through the stationary plate 31 so as to be moved into or away from the mold cavity 39 when the proximate ejector plate 334 is moved to the knock-out position or the retracted position.

The distal ejector plate 335 is disposed in the space 312 distal from the stationary plate 31, and has proximate and distal major ejector surfaces 3351,3352 which are opposite to each other in the axial direction and which confront the proximate ejector plate 334 and the proximate major mounting surface 341 of the mounting support 34, respectively. The distal ejector plate 335 is secured to the proximate ejector plate 334 by means of screws (not shown), and abuts against the butt ends 3322 of the ejector pins 332, thereby securing the inner segments 3321 in the receiving bores 3341. The distal major ejector surface 3352 is guided by guiding rods 333 to be movable in the axial direction so as to abut against the proximate major mounting surface 341 when the proximate ejector plate 334 is moved to the retracted position, as shown in FIG. 5. In addition, with reference to FIG. 8, the distal ejector plate 335 includes an inner peripheral wall 336 which extends from the distal major ejector surface 3352 to the proximate major ejector surface 3351 to confine an accommodation space therebetween. The inner peripheral wall 336 includes wider and narrower segments 3361,3362 which are respectively proximate to and distal from the distal major ejector surface 3352 so as to form a surrounding shoulder mount 3363 therebetween.

The ejector rod 48 passes through the opening 343 in the mounting support 34, and includes an actuated end 484 which is disposed distal from the distal ejector plate 335 and which is actuated by the actuator (not shown) so as to enable the ejector rod 48 to perform the to-and-fro movement, and a head portion 481 which is disposed opposite to the actuated end 484 in the axial direction. The head portion 481 has a plurality of recesses 483 which are angularly displaced from one another about the axis. In this embodiment, the recesses 483 are communicated with one another so as to form an annular groove.

Figure 8:
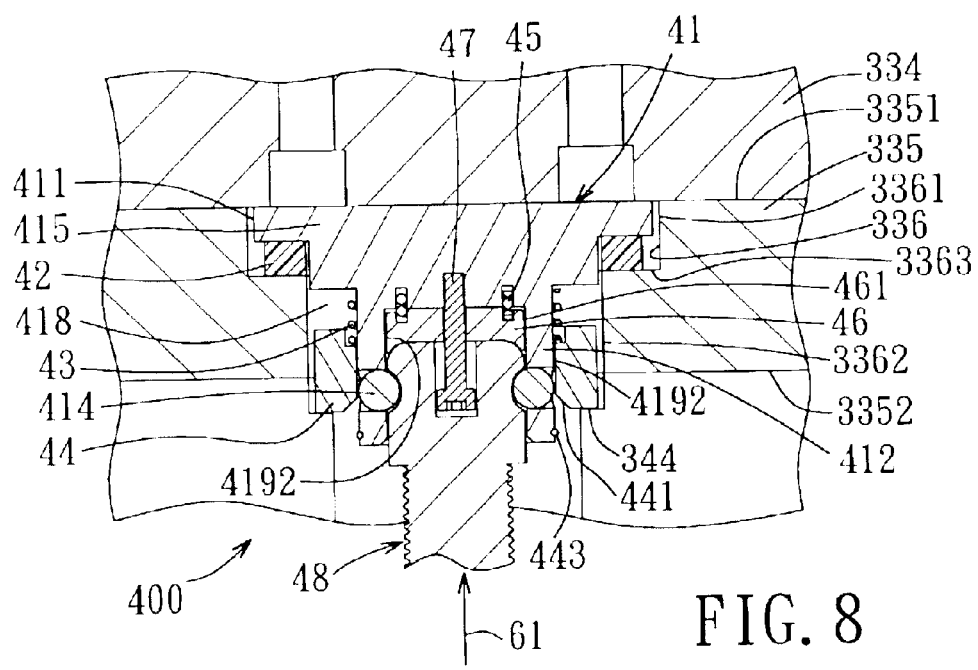
FIG. 8 is a fragmentary sectional schematic view showing the coupler mechanism and the ejector rod when mounted on a distal ejector plate of the preferred embodiment.
Figure 9:
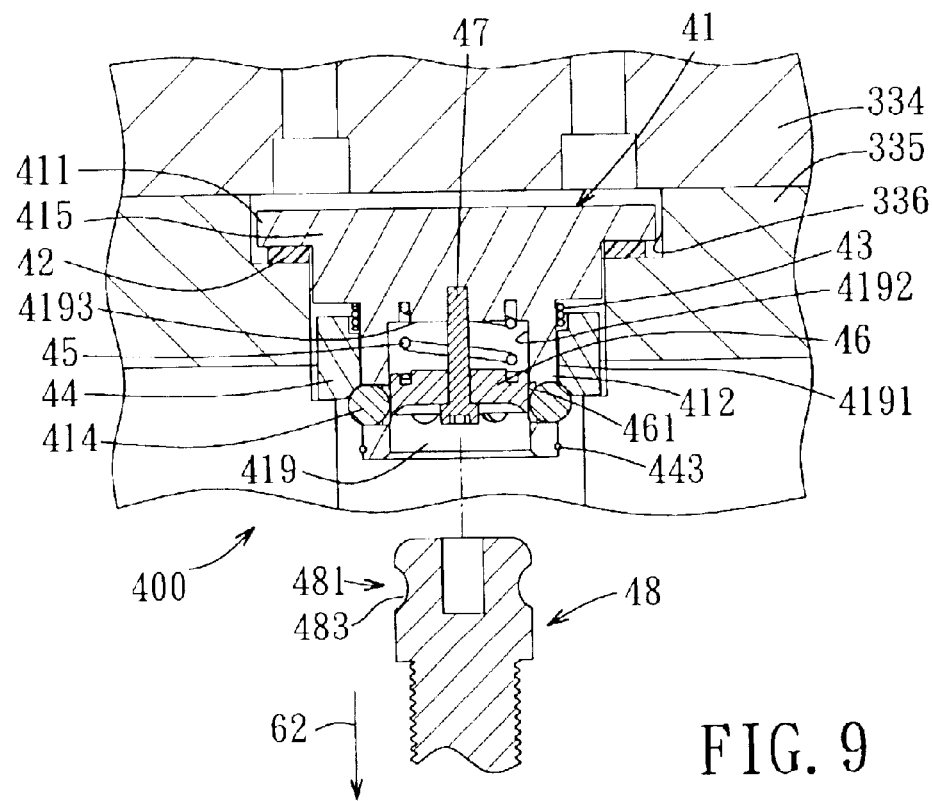
FIG. 9 is fragmentary sectional schematic view showing that the ejector rod is detached from the distal ejector plate.

With reference to FIGS. 7 to 9, the coupler mechanism 400 includes an anchoring member 41, a retaining member, a grip member 46, a first biasing member 45, a surrounding arrest member 44, a second biasing member 43, and a surrounding pad 42.

The anchoring member 41 includes a surrounding coupler wall 410 which is received in the accommodation space of the distal ejector plate 335. The surrounding coupler wall 410 has a mounted surrounding end 415 and a suspended surrounding end 412 which are disposed opposite to each other in the axial direction, and outer and inner surrounding coupler surfaces 4191,4192 opposite to each other in radial directions relative to the axis. The outer surrounding coupler surface 4191 is disposed to be surrounded by and to be spaced apart from the narrower segment 3362, with a surrounding chamber 418 confined therebetween. The inner surrounding coupler surface 4192 confines an access opening 419 to receive the head portion 481 of the ejector rod 48 such that the head portion 481 is slidingly movable relative to the inner surrounding coupler surface 4192 in the axial direction between locked and unlocked positions where the head portion 481 is proximate to the mounted surrounding end 415 and the suspended surrounding end 412, respectively. The access opening 419 extends toward the mounted surrounding end 415 and terminates at an anchored wall 4193.

An anchoring portion 411 is disposed to extend from the outer surrounding coupler surface 4191 in a radial direction relative to the axis, and rests on the surrounding shoulder mount 3363. The surrounding coupler wall 410 has a plurality of slots 413 which are formed proximate to the suspended surrounding end 412, which extend through the inner and outer surrounding coupler surfaces 4192,4191, and which are angularly displaced from one another about the axis.

The retaining member includes a plurality of retaining balls 414 which are received rollably and respectively in the slots 413 so as to be movable in the radial directions. Thus, when the head portion 481 of the ejector rod 48 is moved to the locked position, each of the balls 414 rolls radially and inwardly of the inner surrounding coupler surface 4192 to be retained in the respective recess 483 in the head portion 481 so as to stabilize a frictional engagement between the head portion 481 and the distal ejector plate 335, thereby preventing the head portion 481 from moving relative to the inner surrounding coupler surface 4192, as shown in FIG. 8. When the head portion 481 is moved to the unlocked position, each of the balls 414 rolls radially away from the inner surrounding coupler surface 4192 so as to extend outwardly of the outer surrounding coupler surface 4191 and into the surrounding chamber 418, thereby permitting disengagement of the head portion 481 from the distal ejector plate 335.

The grip member 46 has a peripheral wall 461 which is surrounded by and which is in slidable contact with the inner surrounding coupler surface 4192. The grip member 46 is disposed in the access opening 419 to move toward and away from the anchored wall 4193 so as to be placed in a locked position, where the grip member 46 engages the head portion 481, and in an unlocked position, where the grip member 46 disengages the head portion 481 when the balls 414 are pushed by the peripheral wall 461 to extend into the surrounding chamber 418.

The first biasing member 45 is disposed to bias the grip member 46 to move to its unlocked position. A pin 47 is disposed to position the grip member 46 and the first biasing member 45.

The surrounding arrest member 44 is disposed in the surrounding chamber 418, is rested on the surrounding seat 344 of the mounting support 34, and is in sliding contact with the outer surrounding coupler surface 4191. An annular inner inclined surface 441 is formed proximate to the surrounding seat 344. The surrounding arrest member 44 is moved towards and away from the mounted surrounding end 415 in the axial direction so as to place the surrounding arrest member 44 in an unlocked position, as shown in FIG. 9, where the inner inclined surface 441 of the surrounding arrest member 44 arrests the balls 414, and a locked position, as shown in FIG. 8, where the surrounding arrest member 44 pushes the balls 414 to extend inwardly of the inner surrounding coupler surface 4192. A retaining ring 443 is sleeved on the suspended surrounding end 412 to prevent removal of the surrounding arrest member 44 from the suspended surrounding end 412.

The second biasing member 43 is disposed to bias the surrounding arrest member 44 to move away from the mounted surrounding end 415. The second biasing member 43 has a biasing force which is smaller than that of the first biasing member 45.

The surrounding pad 42 is disposed between the surrounding shoulder mount 3363 and the anchoring portion 411, and is made from a deformable material. Thus, when the mounted surrounding end 415 is brought towards the surrounding arrest member 44 against biasing action of the second biasing member 43, the surrounding pad 42 is deformed in the axial direction.

As shown in FIG. 8, when it is desired to have the head portion 481 engage the distal ejector plate 335, the head portion 481 is inserted into the access opening 419 in the direction of arrow 61. The grip member 46 is moved against the biasing action of the first biasing member 45 until the recesses 483 are registered with the slots 413 so as to permit the balls 414 to roll into the recesses 483. At the same time, the surrounding arrest member 44 is moved away from the mounted surrounding end 415 by the biasing action of the second biasing member 43 to the locked position to cover the slots 413 so as to maintain the balls 414 in the locked position. As such, the engagement of the head portion 481 with the distal ejector plate 335 is maintained when the ejector rod 48 is set in the to-and-fro movement.

Since the to-and-fro movement of the ejector rod 48 is actuated by the actuator, such as a hydraulic cylinder, steady movement of the proximate ejector plate 334 between the knock-out and retracting positions can be maintained so as to ensure that the ejector pins 332 will not be hit upon by molding parts of the injection molding apparatus 300. In addition, the distance of movement of the proximate and distal ejector plates 334,335 in the space 312 is relatively short, thereby resulting in a reduction in the overall size of the device 33.

When it is desired to remove the ejector rod 48 from the distal ejector plate 335, as shown in FIGS. 8 and 9, the actuated end 484 of the ejector rod 48 is actuated by means of the actuator to move in the direction of arrow 62 so as to move the distal ejector plate 335 to the retracted position. Then, when the actuated end 484 is pulled by a jerking force which is greater than the friction force resulting from the frictional engagement between the head portion 481 and the distal ejector plate 335, the surrounding pad 42 is deformed due to movement of the mounted surrounding end 415, and the surrounding arrest member 44, which is rested on the surrounding seat 344, is moved relative to the anchoring member 41 to the unlocked position against the biasing action of the second biasing member 43 such that the balls 414 roll outwardly of the inner surrounding coupler surface 4192 and are disengaged from the recesses 483, thereby permitting disengagement of the head portion 481 from the distal ejector plate 335. At this time, the balls 414 extend outwardly of the outer surrounding coupler surface 4191 and are arrested on the inner inclined surface 441 of the surrounding arrest member 44.

Furthermore, as the ejector rod 48 is detachably coupled to the distal ejector plate 335 by means of the coupler mechanism 400, assembly of the coupler mechanism 400 and the ejector rod 48 is convenient to conduct.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A molded article ejecting device adapted for use in an injection molding apparatus, and adapted to be operated by means of an actuator, the injection molding apparatus including a stationary plate with a first mold portion, and a movable plate with a second mold portion which mates with the first mold portion, the movable plate being disposed to be movable along an axis between an injecting position where the movable plate abuts against the stationary plate such that the first and second mold portions confine a mold cavity for molding of a molded article therein, and a removal position where the movable plate is remote from the stationary plate so as to permit the molded article to be knocked out from the mold cavity, said molded article ejecting device comprising:

a proximate ejector plate adapted to be disposed distal from the movable plate, and movable along the axis between a knock-out position, where said proximate ejector plate is closer to the stationary plate, and a retracted position, where said proximate ejector plate is distant from the stationary plate, said proximate ejector plate having a receiving bore which extends therethrough in an axial direction parallel to the axis;

an ejector pin including an inner segment which is received and fitted in said receiving bore and which terminates at a butt end, and an outer segment which is distal from said butt end and which extends from said inner segment in the axial direction, said outer segment being disposed outwardly of said receiving bore, and being adapted to slidably pass through the stationary plate so as to be moved into or away from the mold cavity when said proximate ejector plate is moved to the knock-out position or the retracted position;

a distal ejector plate adapted to be disposed distal from the stationary plate, and including proximate and distal major ejector surfaces that are opposite to each other in the axial direction, said proximate major ejector surface confronting said proximate ejector plate and being disposed to abut against said butt end, thereby securing said inner segment in said receiving bore;

an ejector rod including an actuated end which is disposed distal from said distal ejector plate and which is adapted to be actuated by means of the actuator so as to enable said ejector rod to perform a to-and-fro movement along the axis, and a head portion which is disposed opposite to said actuated end in the axial direction; and a coupler mechanism disposed to detachably couple said head portion to said distal ejector plate in a frictional engagement such that said engagement is maintained when said ejector rod is set in the to-and-fro movement.

2. The molded article ejecting device according to claim 1, further comprising a mounting support which has proximate and distal major mounting surfaces opposite to each other in the axial direction, said proximate major mounting surface being disposed to confront said distal major ejector surface such that said distal major ejector surface is moved in the axial direction toward or away from said proximate major mounting surface to place said proximate ejector plate in the retracted position or the knock-out position, said distal major mounting surface having an opening extending through said proximate major mounting surface so as to permit said ejector rod to pass therethrough, thereby facilitating disengagement of said head portion from said distal ejector plate when said actuated end is pulled by a jerking force in the axial direction, the jerking force being greater than the friction force resulting from the frictional engagement when said distal major ejector surface is moved to abut against said proximate major mounting surface.

3. The molded article ejecting device according to claim 2, wherein said distal ejector plate includes an inner peripheral wall which extends from said distal major ejector surface to said proximate major ejector surface to confine an accommodation space therebetween, said inner peripheral wall including wider and narrower segments which are respectively proximate to and distal from said distal major ejector surface so as to form a surrounding shoulder mount therebetween, and wherein said coupler mechanism includes an anchoring member including
a surrounding coupler wall received in said accommodation space, said surrounding coupler wall having a mounted surrounding end and a suspended surrounding end opposite to each other in the axial direction, and outer and inner surrounding coupler surfaces opposite to each other in radial directions relative to the axis, said outer surrounding coupler surface being disposed to be surrounded by and to be spaced apart from said narrower segment, with a surrounding chamber confined therebetween, said inner surrounding coupler surface confining an access opening to receive said head portion such that said head portion is slidingly movable relative to said inner surrounding coupler surface in the axial direction between locked and unlocked positions where said head portion is proximate to said mounted surrounding end and said suspended surrounding end, respectively, and an anchoring portion disposed to extend from said outer surrounding coupler surface in a radial direction relative to the axis, and confronting and resting on said surrounding shoulder mount; and a retaining member disposed in said surrounding coupler wall and proximate to said suspended surrounding end, said retaining member being movable in the radial direction such that when said head portion is moved to the locked position, said retaining member is moved radially to extend inwardly of said inner surrounding coupler surface so as to retain and to prevent said head portion from moving relative to said inner surrounding coupler surface, and such that when said head portion is moved to the unlocked position, said retaining member is retracted radially and from said inner surrounding coupler surface so as to release said head portion, thereby permitting disengagement of said head portion from said distal ejector plate.

4. The molded article ejecting device according to claim 3, wherein said surrounding coupler wall has a plurality of slots which extend through said inner and outer surrounding coupler surfaces and which are angularly displaced from one another about the axis, and wherein said retaining member includes a plurality of retaining balls received rollably and respectively in said slots such that in the locked position, each of said balls rolls radially and inwardly of said inner surrounding coupler surface, and such that in the unlocked position, each of said balls rolls away from said inner surrounding coupler surface so as to extend outwardly of said outer surrounding coupler surface and into said surrounding chamber.

5. The molded article ejecting device according to claim 4, wherein said head portion has a plurality of recesses angularly displaced from one another about the axis such that in the locked position, said balls extend to engage said recesses respectively so as to stabilize the frictional engagement between said head portion and said distal ejector plate.

6. The molded article ejecting device according to claim 5, wherein said access opening extends toward said mounted surrounding end, and terminates at an anchored wall, and wherein said coupler mechanism further includes a grip member which has a peripheral wall surrounded by and in slidable contact with said inner surrounding coupler surface, and which is disposed in said access opening to move toward and away from said anchored wall so as to be placed in a locked position, where said grip member engages said head portion, and in an unlocked position, where said grip member disengages said head portion when said balls are pushed by said peripheral wall to extend into said surrounding chamber; and a first biasing member which is disposed to bias said grip member to move to the unlocked position.

7. The molded article ejecting device according to claim 6, wherein said mounting support includes a surrounding seat which is disposed inwardly of said proximate major mounting surface, which confronts said surrounding chamber in the axial direction, and which communicates with said opening in the radial directions, and wherein said coupler mechanism further includes

- a surrounding arrest member which is disposed in said surrounding chamber, which is rested on said surrounding seat, and which is in sliding contact with said outer surrounding coupler surface, said surrounding arrest member being moved towards and away from said mounted surrounding end in the axial direction so as to place said surrounding arrest member in an unlocked position, where said surrounding arrest member arrests said balls, and a locked position, where said surrounding arrest member pushes said balls to extend inwardly of said inner surrounding coupler surface; and
- a second biasing member disposed to bias said surrounding arrest member to move away from said mounted surrounding end.

8. The molded article ejecting device according to claim 7, wherein said coupler mechanism further includes a surrounding pad which is disposed between said surrounding shoulder mount and said anchoring portion, and which is made from a deformable material such that when said mounted surrounding end is brought towards said surrounding arrest member against biasing action of said second biasing member, said surrounding pad is deformed in the axial direction.

* * * * *